United States Patent [19]

VanNess et al.

[11] 4,419,300

[45] Dec. 6, 1983

[54] NON-CORROSIVE, NON-STAINING EVAPORATIVE COOLER

[75] Inventors: David VanNess; Joseph Hines, both of Scottsdale; William E. Wells, Phoenix, all of Ariz.

[73] Assignee: General Texas Corporation, Roanoke, Tex.

[21] Appl. No.: 336,012

[22] Filed: Dec. 30, 1981

Related U.S. Application Data

[63] Continuation of Ser. No. 126,870, Mar. 3, 1980, Pat. No. 4,309,365.

[51] Int. Cl.³ .............................................. B01F 3/04
[52] U.S. Cl. .................................... 261/106; 62/304; 62/DIG. 16; 312/31.04; 312/31.05; 261/97; 261/DIG. 3; 261/DIG. 41
[58] Field of Search ................... 261/26, 29, 36 R, 70, 261/72 R, 74, 97, 110, 105, 103, 106, 92, 114 R, DIG. 41, DIG. 3, DIG. 4, DIG. 46; 62/304, 310, 314, 315, DIG. 16; 220/62, 77; 312/31, 263, 31.01–31.06, 31.1–31.3; 422/122–124

[56] References Cited

U.S. PATENT DOCUMENTS

| | | | |
|---|---|---|---|
| 2,856,166 | 10/1958 | Goettl | 261/29 |
| 3,115,222 | 12/1963 | Goettl et al. | 261/DIG. 41 |
| 3,284,068 | 11/1966 | Goettl | 261/97 |
| 3,917,757 | 11/1975 | Hoag | 261/92 X |
| 4,049,150 | 9/1977 | Goettl | 220/62 |
| 4,080,410 | 3/1978 | Goettl | 261/DIG. 41 |
| 4,101,609 | 7/1978 | Sumrow | 261/105 |
| 4,159,291 | 6/1979 | Bruckert et al. | 261/114 R |
| 4,200,599 | 4/1980 | Goettl | 261/97 |

*Primary Examiner*—Richard L. Chiesa
*Attorney, Agent, or Firm*—Don J. Flickinger

[57] ABSTRACT

An evaporative cooler body comprises a non-corrosive, insulative assembly of self-locating, self-jigging parts. Stand-off means are provided for increasing the effective area of the evaporative cooling pads and for improving air flow across the surface of and through said pads. An improved water distribution means permits sheeting of the water across the top surfaces of the evaporative cooling pads to obtain a more uniform distribution of water within said pads. Means are provided for interrupting water flow on the surface of the evaporative cooling pads and returning such water to the interior of said pad so as to increases the overall efficiency of the evaporative cooler. The evaporative cooler cabinet is comprised of a minimal number of reaction injection molded elements of high modulus urethane elastomer. The material insulates both sound and heat providing a quieter running and more cooling-efficient device. Color may be permanently molded into the cabinet. The cabinet will not rust, chip, corrode or fade. Precision molding of the elements permits the cabinet to be assembled readily without the need for welding, rivets, screw fasteners or the like since the precision fit of the parts makes the assembly a self-jigging one.

5 Claims, 15 Drawing Figures

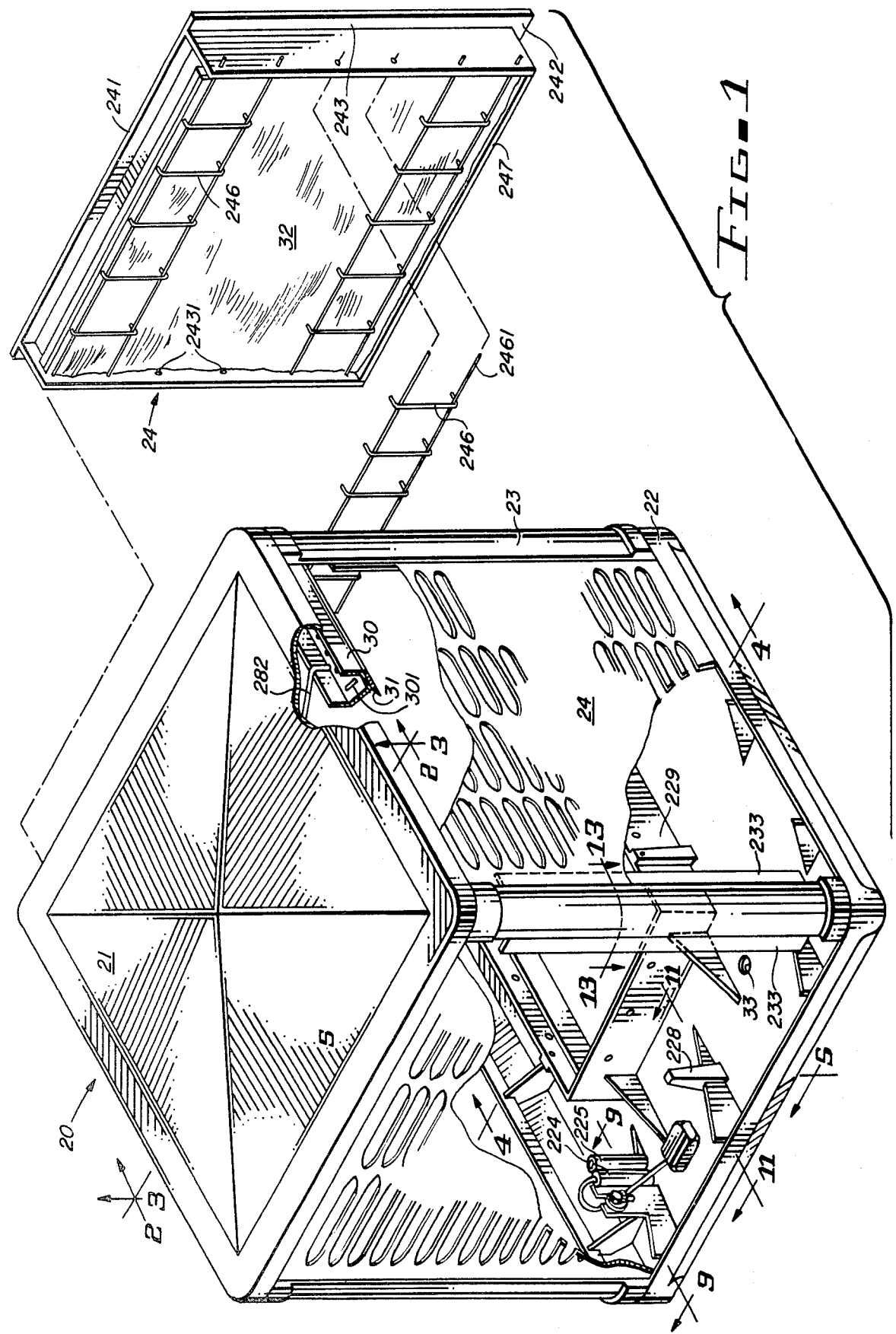

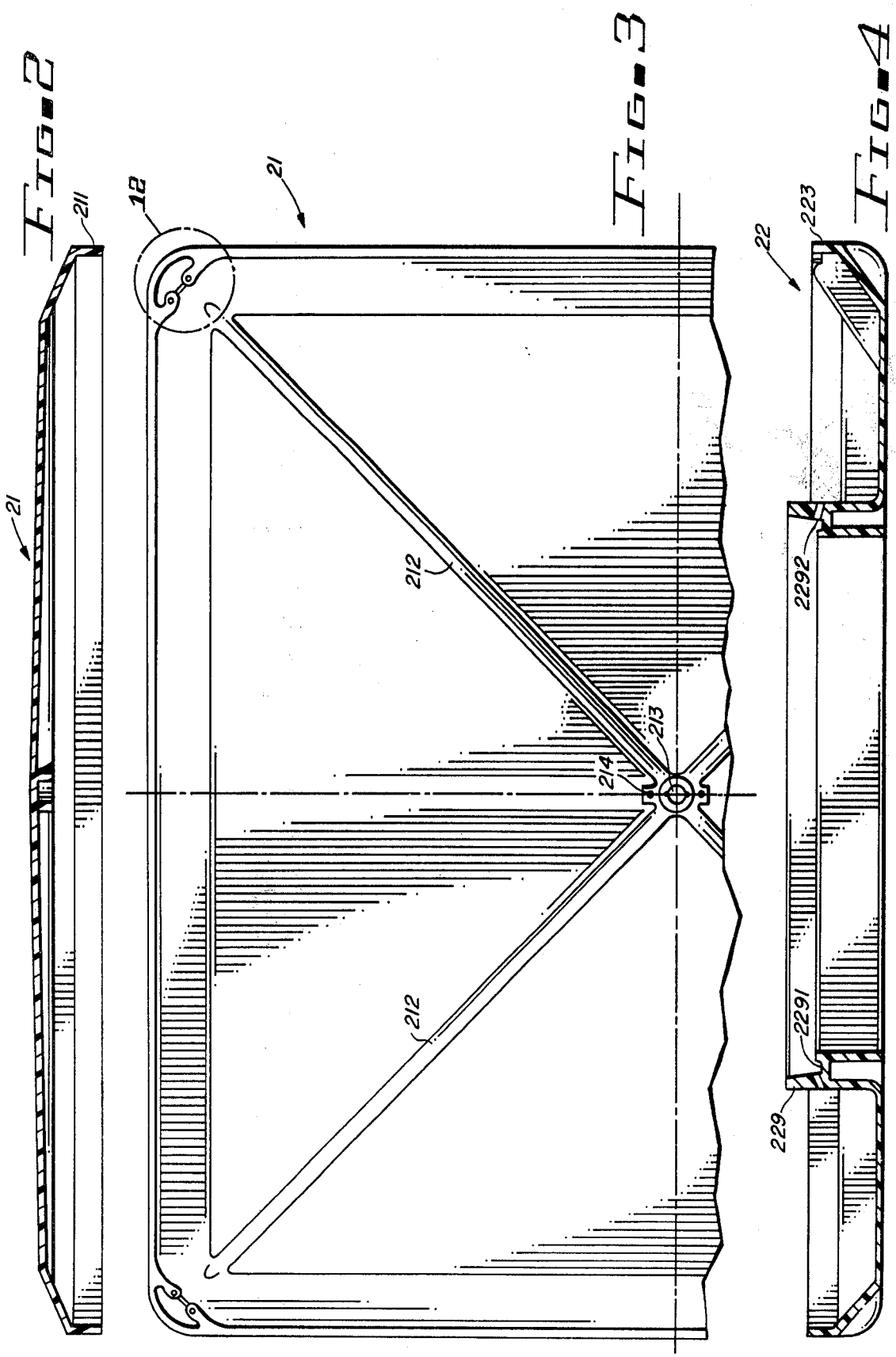

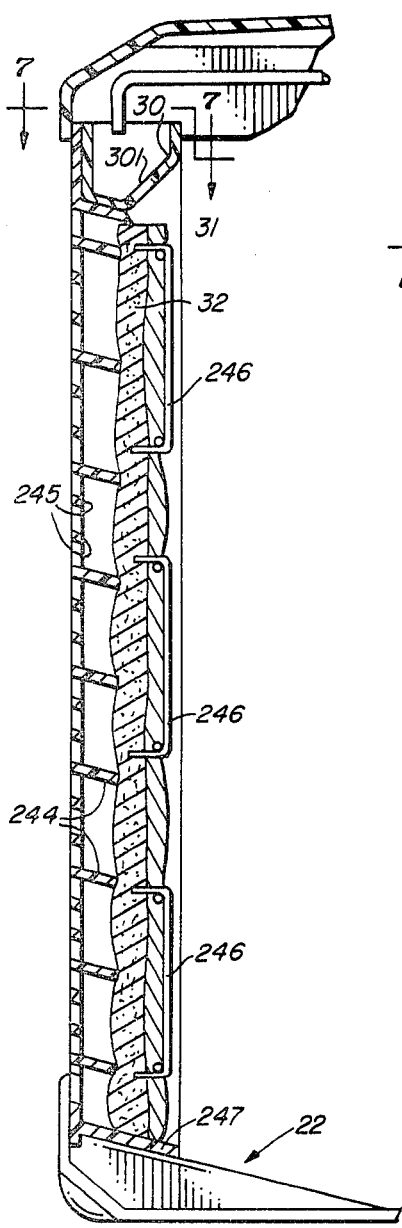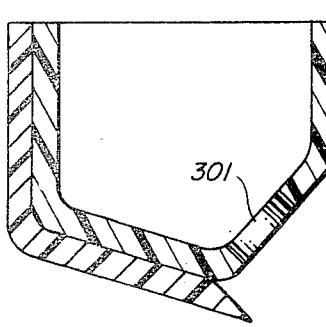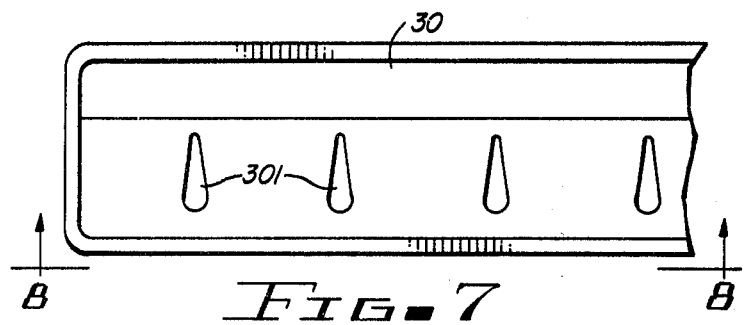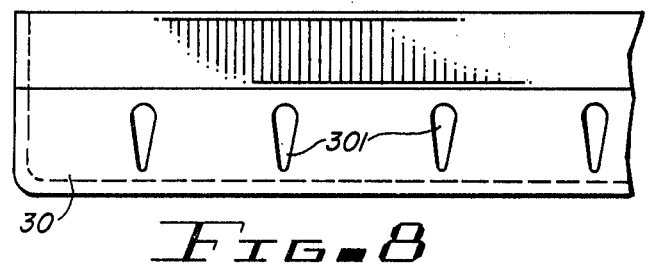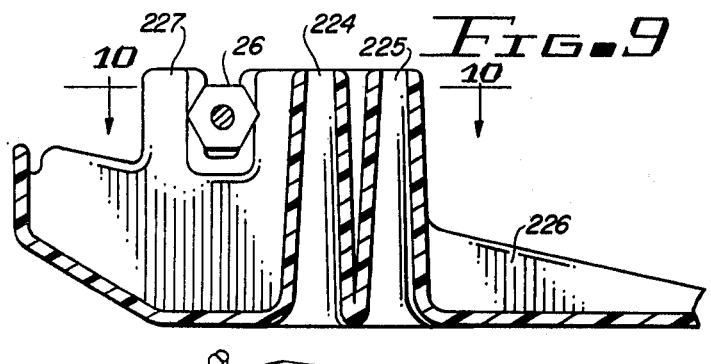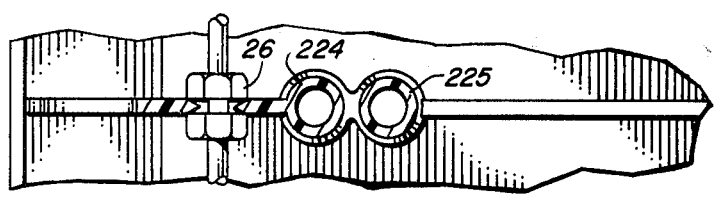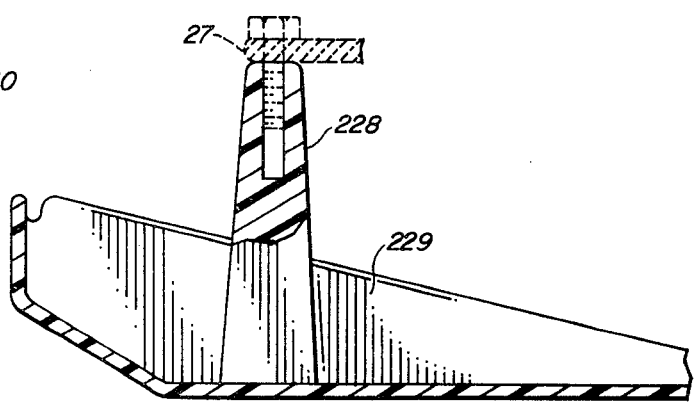

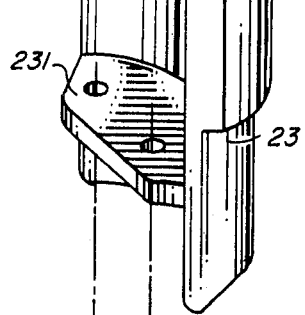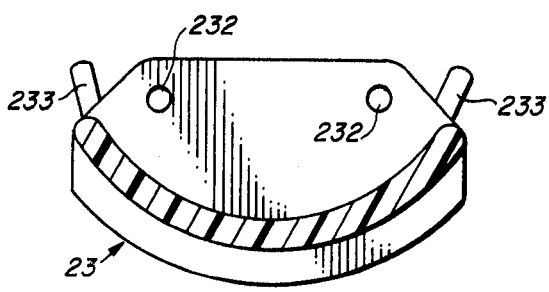
FIG. 12
FIG. 13
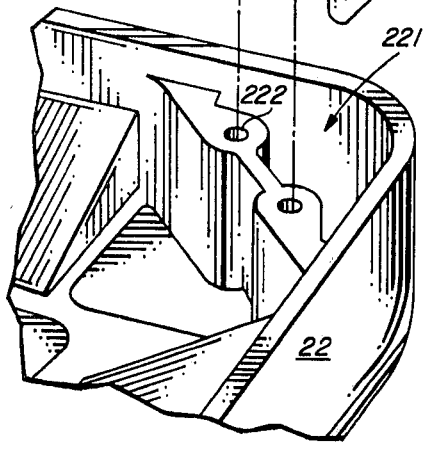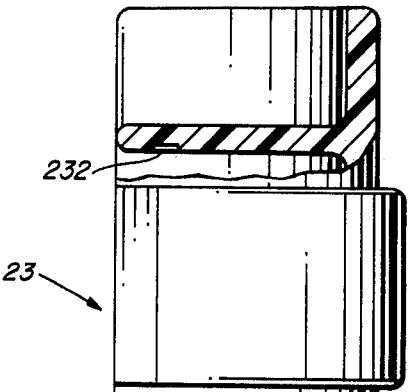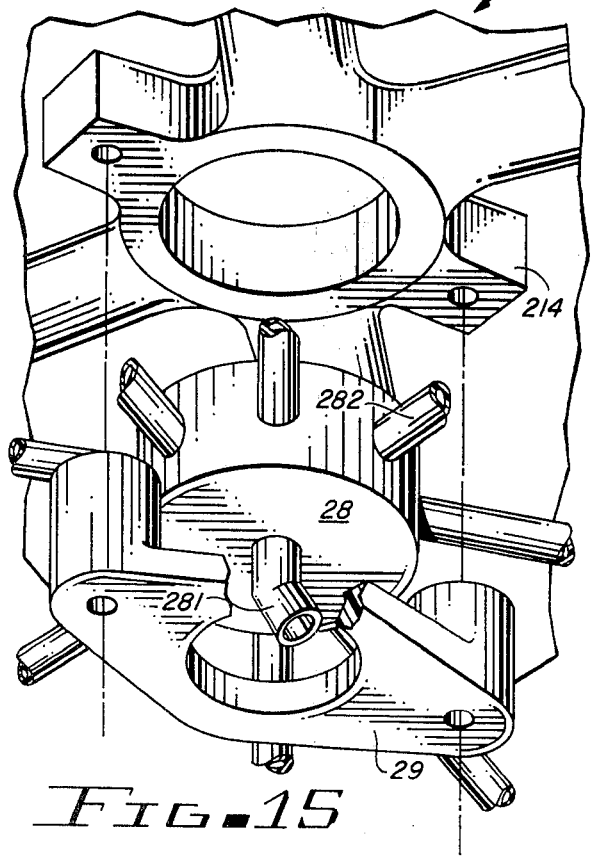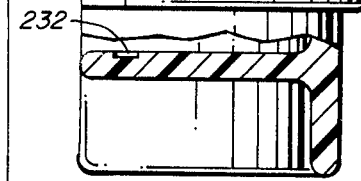
FIG. 15
FIG. 14

NON-CORROSIVE, NON-STAINING EVAPORATIVE COOLER

This application is a continuation of application Ser. No. 06/126,870, filed Mar. 3, 1980, now U.S. Pat. No. 4,309,365, issued Jan. 5, 1982.

BACKGROUND OF THE INVENTION

1. Field of the Invention

The invention relates to the field of evaporative cooling devices. In particular, the invention relates to a lightweight, extremely durable evaporative cooler having a cabinet which will not rust, corrode, chip, or fade; which provides a highly efficient non-turbulent air flow; and which provides evaporative cooling pad support means which provides a higher than herebefore effective cooling area from a given evaporative cooling pad.

2. Description of the Prior Art

Cooling of building interiors by means of evaporative coolers is well known in the prior art. In that field, Adam D. Goettl appears to be one of the most prolific inventors. Of his many patents, several are listed here as good examples of prior art evaporative cooler construction techniques. These are U.S. Pat. No. 3,147,319 issued 1 Sept. 1964; Pat. No. 3,287,003 issued 22 Nov. 1966; Pat. No. 4,045,523 issued 30 Aug. 1977; and Pat. No. 4,080,410 issued 21 Mar. 1978.

All of the known prior art, including that of Goettl, lend themselves to a series of common problems in the operation and maintenance of evaporative coolers. All of the cabinetry is comprised of a multiplicity of parts joined by welds or screw fastening or the like. Such an assemblage provides a plurality of seams from which water may leak or cavities in which water may become entrapped. Water leaking through to the exterior of the cooler leaves unsightly deposits and causes deterioration of the surface finish of the cooler.

Most cooler cabinets are fabricated of sheet metal which is given to corroding in the highly humid environment provided by the interior of the evaporative cooler. Further, corrosion often takes place as a result of water entrapped within various hidden cavities formed in assembling the cooler cabinet.

A not unfamiliar sight on rooftops is an evaporative cooler having a discolored exterior with paint flaking therefrom.

In the assembly of prior art evaporative coolers, holes are often punched through the sheet metal to allow the flow of water through said holes. Other holes are punched to accept various fastening devices utilized in assembling the cabinet. Whether drilled or punched, such holes are seldom, if ever, smoothly finished and are left with a burred edge. This burring actually inhibits the free flow of water through such holes and further, provides a means for entrapping water around the various fasteners in the assembly, which increases the probability of corrosion occurring at the site of such fasteners.

In addition to water leaking from various seams in the structure of the cooler cabinet, much of the structural elements of the cabinetry design were such as to induce the flow of water to the outside of the cabinet. Openings in the sides of most prior art evaporative cooler cabinets are provided with louvers. The louver panel over each opening projects outward from the cabinet and at a slight downward angle. Moisture condensing on the inside walls of such a louvered opening is encouraged by the disposition of the louver panel to move outward and down to the edge of the louver panel from whence the condensate drips downward frequently splashing the outside of the cabinet as well as the surrounding area and leaving unsightly mineral deposits in its wake.

Cooling with an evaporative cooler is achieved by passing air through a moistened evaporative cooling pad. Prior art attempts at supporting evaporative cooling pads in the flow of air, required to achieve evaporation, frequently block a significant portion of the air flow and thereby reduce the effective cooling area of a given size evaporative cooling pad. The combination of louvered openings and evaporative pad support means frequently caused turbulence within the air flow further reducing the effectiveness of the cooling. A laminar air flow through a cooling pad having a support offering minimal restriction to such air flow is to be desired for most effective cooling.

A sound familiar to many residential areas is the noise created within rooftop evaporative coolers and amplified by the resonant metallic cabinets and the wealth of individual elements of which such cabinets are comprised. Such noises not only prove aggravating to neighbors but can be extremely noisy to residents of the building being cooled by such rattle-trap coolers. The amplified noise and resonant vibrations are passed down through the cooling ducts to the interior of the building to impinge harmfully on the sensibilities of the tenant therein.

Finally, it may be noted, too, that maintenance is often most difficult in evaporative coolers fabricated in accord with prior art teachings. The metallic cabinetry components tend to corrode and stick. Under the heating effects of the sun's rays, the various cabinetry elements expand and dissassembly of the cabinet becomes, at best, a trying experience.

The need is thus seen to exist for a new, improved means of constructing an evaporative cooler.

It is, therefore, an object of the present invention to provide an evaporative cooler which overcomes all of the disadvantages of prior art coolers including those disadvantages such as set out above.

It is a particular objective of the invention to provide an evaporative cooler having a cabinet which will not rust, fade, corrode, or chip.

It is a further objective of the invention to provide an evaporative cooler having a cabinet comprised of a minimum number of parts which may be assembled without the need for welding, rivets or other such fastening devices.

It is a specific objective of the invention to provide an evaporative cooler which provides for the free unimpeded flow of water to desired disposition points and which discourages the flow of moisture to undesirable destinations, especially inhibiting such flow to the exterior of said evaporative cooler.

It is a further specific objective of the invention to provide minimal restriction to air flow to the evaporative cooling pads of the cooler and to do so in a manner which will result in a large effective cooling area for any given size cooling pad.

Another particular objective of the invention is to provide a cabinet which has outstanding sound absorption qualities so as to provide for quieter operation of said cooler, and in doing so, to provide a cabinet of excellent heat insulative qualities so as to provide a cooler interior for the evaporative cooler and thereby increase its operating efficiency.

It is an additional objective of the invention to provide for ease of maintenance of the cooler by utilizing materials in the fabrication of the cooling cabinet which material is not given to sticking, corrosion or expansion.

These and other objectives of the invention will be made apparent in the detailed description of the invention and the accompanying drawings.

SUMMARY OF THE INVENTION

An evaporative cooler has body means comprising a non-corrosive, insulative assembly of self-locating, self-jigging parts. Stand-off means are provided for increasing the effective area of the evaporative cooling pads and for improving air flow across the surface of and through said pads. An improved water distribution means permits sheeting of the water across the top surfaces of the evaporative cooling pads to obtain a more uniform distribution of water within said pads. Normally, a significant amount of water injected into the evaporative cooling pads will find its way to the surface of said pads from whence it runs rapidly down the surface. Since such superficial beads of water running down the surface of the evaporative cooling pad contribute little or nothing to the evaporative cooling effect, means are provided for interrupting water flow on the surface of the evaporative cooling pads and returning such water to the interior of said pad so as to increase the overall efficiency of the evaporative cooler. The evaporative cooler cabinet is comprised of a minimal number of reaction injection molded (RIM) elements of high modulus urethane elastomer. Precision molded parts of this material offer several advantages. The material insulates both sound and heat, providing a quieter running and more cooling efficient device. Color may be permanently molded into the cabinet, forever precluding the need to paint same, although the option to paint the cabinet remains with the user. The cabinet will not rust, chip, corrode or fade and is readily cleansed with soap and water since dirt and scale will not lock onto the surface. Precision molding of the elements permits the cabinet to be assembled readily without the need for welding, rivets, screw fasteners or the like since the precision fit of the parts makes the assembly a self-jigging one. In the embodiment disclosed herein, only 10 precision molded parts are utilized: a top, a base, four readily removable and ventilated side plates, and 4 cornerposts. Because the precision molding of the elements provides a sliding, location-fit of the parts, the ventilated side plates are easily removed so as to make the interior of the cooler readily accessible for maintenance.

BRIEF DESCRIPTION OF THE DRAWINGS

FIG. 1 is an isometric assembly of the cooler cabinet with cut-aways permitting a view of the interior thereof. One ventilated side panel is shown removed so as to illustrate the manner in which the evaporative cooling pads are supported.

FIG. 2 is a cross-sectional view of the top cover of the evaporative cooling panel.

FIG. 3 is a partial plan view of the interior of the top of the cooler cabinet.

FIG. 4 is a cross-sectional view of the base of the cooler cabinet illustrating a portion of the fluid reservoir within the base and the stand on which the evaporative cooler fan is established, which stand provides a drainage trough to prevent condensate which forms on the outside of the fan housing from entering and down into the air duct.

FIG. 5 is a cross-sectional view which sets forth the manner in which water is brought to a water distribution trough from whence it flows to a lip-like edge which causes the water to sheet along said edge and to be deposited uniformly onto the evaporative cooling pad. Also shown is the manner in which the pad is maintained a distance removed from the ventilated side panels so that air may flow through the vents of the side panels and be distributed across the face of the evaporative cooling pad and then drawn through it. This arrangement yields a high effective cooling area for any given pad. The illustration also shows the manner in which water is returned from the pad to the reservoir in the base of the cabinet.

FIG. 6 is a cross-sectional view of the water distribution trough showing the lip-like edge along which water is sheeted to the evaporative cooling pads.

FIGS. 7 and 8 are plan and elevation views of a portion of the water distribution trough showing the water outlet holes which are smooth-edged, without burrs, and provide for free passage of water therethrough.

FIGS. 9 and 10 are elevation and plan views of the structure which provides egress to the interior of the cooling cabinet for water supply lines and also the manner whereby an adjustable float device may be affixed so as to provide an infinitely variable adjustment of water level within the reservoir.

FIG. 11 is an elevation view of the structure which is integral with the base of the cooler cabinet and which provides the means for supporting the necessary water distribution pump.

FIG. 12 is a detailed drawing illustrating the manner in which the precision molded elements interlock to form a self-jigging assembly. FIG. 12 illustrates the manner in which a cornerpost is joined to either the base or the cover of the cooler cabinet.

FIG. 13 is a cross-sectional view of the precision molded cornerpost.

FIG. 14 is an elevation view of the cornerpost of FIG. 13.

FIG. 15 illustrates the central water distribution block from which water is ducted to each of the water distribution troughs. Water is provided to the central distribution block from the water distribution pump.

DETAILED DESCRIPTION OF THE INVENTION

The evaporative cooler of the invention is generally designated by reference 20 and is illustrated in the isometric assembly drawing of FIG. 1. Cut away views permit the illustration of the interior details of the cooler. As is typical, the cooler of the invention will include a fan, a fan drive motor, and a water circulating pump. These commonly provided elements have been omitted from the drawing of FIG. 1 so as to more clearly illustrate the details of construction. Ten precision molded elements comprise the principle component of the evaporative cooler cabinet. These include a cabinet top 21, a cabinet base 22, four cornerposts 23, and four ventilator panels 24. Precision molding of these elements results in a self-locking, self-jigging assembly which requires no welding, riveting, or other fastening means to provide a rigid structure. However, as will be disclosed, sixteen non-corrosive fasteners are utilized to preserve the integrity of the structure while it is being handled and while it is in use and exposed to the vagaries of the environment.

The manner in which cornerposts 23 are assembled to base 22 and top 21 is best illustrated in FIG. 12. Here cornerpost 23 is ready to be inserted in self-locking arrangement with base 22. The corner structural arrangement 221, as well as an identical structural arrangement in the corners of top 21, provide a socket into which an extremity of cornerpost 23 may be inserted so as to form a self-locking, self-jigging assembly.

When cornerpost 23 is inserted in socket arrangement 221 of base 22, pad 231 will come to rest on lands 222 of base 22. As is best seen in FIG. 14, molded cornerposts 23 include hardward locating recesses 232. These recesses 232 are utilized by assembly technicians to locate non-corrosive, self-tapping hardware. When a self-tapping fastener is driven into recess 232, it passes through pad 231 mechanically coupling that pad to lands 222. Such mechanical coupling is utilized to preserve the integrity of the assembly while it is being handled and while it is exposed to the extremes of the environment. It should be noted that such mechanical fastening devices are incorporated in the assembly as a conservative safety feature since the self-locking, self-jigging arrangement of structural elements provides a rigid cooler assembly.

As already noted, the self-locating, self-jigging assembly of cornerposts to top 21 is accomplished in the same manner as that just described with respect to base 22.

Once cooler top 21 is supported above base 22 by cornerposts 23, ventilator panels 24 are added to the assembly. As with all other molded elements of the cabinet, ventilator panels 24 are designed to be self-locating and self-jigging. To emplace ventilator panel 24 in the assembly, its top edge 241 is inserted up behind side wall 211 of top 21. The lower edge 242 of panel 24 is then moved forward so as to bring side walls 243 of panel 24 to bear against the surfaces of flanges 233 of cornerpost 23. A downward pressure is then exerted on panel 24 to cause its lower edge 242 to pass behind side wall 223 of base 22. The precision molding of the parts permits a "location fit" allowing the elements to be self-locking and self-jigging. The nature of the location fit permits ventilator panels 24 to be easily slid up and out without binding. The ease with which side panels 24 may be emplaced and removed makes the interior of the cooler readily, and easily accessible for maintenance purposes.

As with all evaporative coolers, the cooler of the invention must be coupled to a source of water. Base 22 acts as a reservoir to store water which will be circulated by a pump to evaporative cooling pads. To preserve the watertight integrity of base 22, cylindrical sleeves 224 and 225 are provided and molded as an integral part of base 22. These sleeves provide ingress means for water tubing 25 and act as a safety overflow outlet should water in the reservoir reach an excessive depth. For added strength, sleeves 224 and 225 are molded as a part of reinforcing plate 226. An upward extension 227 is notched to permit mounting thereon of a float controlled valve seat 26. The water level within the reservoir of base 22 may be readily established by controlling the position of valve seat 26 in the notch of plate extension 227. Thus, in establishing the working depth of the reservoir, valve seat 26 may be positioned at the top of extension plate 227 permitting water to flow through valve seat 26 so as to flood the reservoir of base 2. When the desired water depth is achieved, valve seat 26 is lowered in the notch of extension plate 227 so as to cause float 261 to rise and terminate the flow of water. Valve seat 26 is then locked into position and the adjustment is completed without the trial and error adjustments entailed with prior art techniques involving bending of the float arm.

Water is circulated from the reservoir of base 22 by means of a water circulating pump, not shown. A truncated obelisk 228 is molded integral with base 22 and reinforcing plate 229 to provide a stable support for the water circulating pump. The drawing of FIG. 11 illustrates the manner in which the pump support bracketry may be affixed to the truncated obelisk 228. Bracketry 27 is suggested in phantom outline in FIG. 11.

Oversized tubing is used in the water circulating path between the water circulating pump and the evaporative cooling pads. The use of oversized tubing maximizes fluid flow while minimizing any probability that the tube will be obstructed. Top cover 21 is molded with oversized reinforcing sections 212 which run between diametrically opposed corners of top cover 21 and which intersect at the center of that cover. The intersection 213 is broadened and shaped to provide means 214 for mounting a water distribution block 28, as is best seen in FIG. 15. Straddle clamp 29 straddles water distribution block 28 and maintains block 28 in position against mounting means 214 by use of screw fasteners, not shown.

The water distribution pump conveys water from the reservoir of base 22, via oversized tubing, to water input port 281 of water disbribution block 28. Water distribution block 28 is equipped with eight output ports to which are coupled water distribution ducts 282. Water distribution ducts 282 are again comprised of oversized tubing.

Water distribution ducts 282 convey water from block 28 to water distribution troughs 30 as is shown in the perspective view of FIG. 1 and in cross-sectional detail in FIG. 5. Water enters troughs 30 from distribution ducts 282 and then exits the troughs via molded openings 301. Molded openings 301 are smooth-edged and have no burrs such as are present with prior art devices. Therefore, water flows smoothly and freely through these openings and out of the trough. The water flow out of the trough is intercepted by knife edge lip 31 which draws the water from the various openings 301 into a continuous sheet of water along edge 31. Edge 31 is maintained in contact with cooling pads 32. The sheeting effect produced by edge 31 assures a uniform wetting action of evaporative cooling pads 32. In prior art devices where water merely dribbled from openings in water distribution troughs, the tendency was for the water to seek the path of least resistance, often leaving portions of the evaporative cooling pad dry and therefore contributing nothing to the effective cooling performance of the prior art cooler. The novel sheeting effect, to achieve uniform distribution of water into cooling pads 32 of the instant invention, obviates the nonuniform saturation of cooling pads of prior art devices.

Ventilator panel 24 is designed so as to provide support for evaporative cooling pads 32. As FIG. 1 and FIG. 5 illustrate, removal of ventilator panel 24 from cooler cabinet 20 results in the removal of the evaporative cooling pad 32 as well. This arrangement implements the maintenance of cooling pad 32 and makes it a simple matter to remove and replace cooling pads.

Ventilator panels 24 are equipped with stand-off lands 244. These lands serve two functions which greatly improve the cooling efficiency of the cooler disclosed herein when compared with prior art devices.

Ventilator panel 24 is equipped with vent openings 245. These openings are not equipped with louvers and therefore they are fully effective to implement the free and easy flow of air therethrough. In many prior art devices, the flow of air into the cooler is impeded by the fact that the evaporative cooling pad is placed flush or nearly so with the openings in the ventilator panel. This greatly reduces the effective cooling area of the evaporative cooling pad. In the invention herein described, stand-off lands 244 set cooling pad 32 back a full inch from ventilator openings 245 to provide complete air distribution over almost the entire cooling pad area. Stand-off lands 244, in cooperation with pad retainer means 246, block so little air that, with a conventional 28 inch by 34 inch evaporative cooling pad, fully 94% of pad free-area is exposed to the evaporative cooling effect of the moving air. This represents a significant improvement over the prior art with respect to utilization of the available pad free-area of an evaporative pad.

Stand-off lands 244 are designed to further increase the efficiency of the evaporative cooler which is the subject of this invention. An examination of the illustration of FIG. 5 reveals that stand-off lands 244 maintain contact with the surface of cooling pad 32. This provides for freedom of air flow across the surface of said pad. In addition, stand-off lands 244 are inclined downwardly toward the reservoir of base 22. In conventional evaporative coolers, a significant amount of water deposited at the top of the pad finds its way to the surface of the evaporative cooling pad from whence beads of water run rapidly down across the surface of the pad contributing little or nothing to the saturation of the pad and therefore ineffectively contributing to the evaporative cooling effect. In the present invention, stand-off lands 244 being in contact with the surface of cooling pad 32 intercept any superficial water which tends to run down the surface of cooling pad 32. The inclined slope of lands 244 returns the water so intercepted to the pad in a manner which engenders its absorption by the pad material. Upon being absorbed by the evaporative cooling pad material, the water so returned to the pad is better disposed to the evaporative effects of the air flowing through the pad and thus increases the effective evaporative cooling effect of the overall system.

Water exiting the evaporative cooling pad 32 at its lower extremity is intercepted by base panel 247 which is an integrally molded part of ventilator panel 24. Base panel 247 is inclined toward the reservoir of cabinet base 22 and being integral with ventilator panel 24 prevents any water from flowing to the outer surface of cooling cabinet 20.

As already noted, evaporative cooling pads 32 are held in place by pad retaining means 246. These retaining means cooperate with horizontal support rods 2461 which are received by openings 2431 in side walls 243 of ventilator panel 24. Evaporative cooler pad support means 246 are engaged with and removed from pad 32 by bowing horizontal support rods 2461 to permit their engagement or disengagement with openings 2431 in side wall 243. All such pad retaining hardware is made of a non-corrosive material such as stainless steel.

Molded as an integral part of base 22 is a dam-like structure 229 which precludes water from entering the cooling duct work and provides means for supporting the evaporative cooling fan, which fan has been omitted from the drawings for clarity of detail. In prior art devices, sealants and splash shields are used to prevent water which condenses on the fan assembly from entering the duct work. Sealants and various splash guards are used with varied success. Water entrainment in duct work using prior art evaporative coolers is a common occurrence. As is best seen in FIG. 4, the dam-like structure 229 provides a recessed drip ring 2291 which is of a size to accept the base of the fan assembly utilized with the invention. Any water condensing on either the inside or the outside of the fan assembly and running to its base will be intercepted by drip ring 2291. Weepholes 2292 are provided to drain condensate from drip ring 2291 and return it to the reservoir of base 22. With this arrangment, there is little or no likelihood of water entrainment in the duct work associated with the invention.

Base 22 is provided with a drainage port 33 to provide a convenient means for draining the reservoir of base 22. Drainage port 33 is normally plugged during operation of the evaporative cooler.

As already noted, precision molding of the cooler cabinet permits the parts to be self-locating and self-jigging. All surfaces which are subjected to moisture are designed to discourage the flow of moisture to the exterior of the cooler cabinet and to return it to the reservoir of base 22. Without limiting the designer's choice of materials, it is suggested that a preferred embodiment of the invention will be reaction injection molded of a high-modulus urethane elastomer. Those skilled in the art will already be familiar with reaction injection molding techniques. Additional information may be obtained by reading "Introduction to Reaction Injection Molding" by F. Melvin Sweeney, Technomic Publishing Company, Inc., 1979, ISBM #087762-271-X. As for choice of actual material to be used, Union Carbide Corporation's RIM 120 or RIM 125 is suggested for its excellent physical properties as well as ease of processing. Coloring may be injected into the material during the course of its molding so that the final product need never require painting. Since the parts are not subject to corrosion or expansion, sliding panels such as ventilator panels 24 are easily and readily removed for maintenance of the cooler. Prior art devices have utilized various materials such as fiberglass, foam, and metal. Fiberglass is an expensive material if laid up by hand and, if done mechanically, requires costly presses and entails high cost molds. Foamed material is often unsightly when molded and, when colored, tends to present a milky appearance. Further, foams are highly susceptible to ultraviolet ray damage. If injection molding techniques are utilized with foams, exceedingly expensive manufacturing tooling and machining are entailed. The problems with metal cabinetry have already been discussed. This includes corrosion, rusting, the need for special coatings to make the metals compatible with a highly humid, wet environment, and the multiplicity of parts which require sealing in order to restrain water flow and which tend to be noisy.

The reaction injection molded urethanes suggested for use with the evaporative cooler disclosed herein is the same material presently being used for collision-absorbing front-ends of automobiles. It is tough, non-corrosive, resilient, and lighter than metal. Reaction injection molding, RIM, is the name given to the process which forms polymeric products from highly reactive chemicals using high pressure impingement mixing machines. The resultant product is strong and of high quality and relatively inexpensive to fabricate when compared with costs of production of prior art evaporative coolers.

The invention herein described is an evaporative cooler whose cabinet is comprised of a minimal number of precision molded, self-locating, self-jigging elements. The cooling-efficiency of the resultant cooler is enhanced by means which discourage the flow of water to the exterior of the cooler, enhance air flow across and through evaporative cooling pads, return water flowing across the surface of the cooling pads to the interior thereof, and support the cooling pads in a manner which, size-for-size, provides 20% greater utilization of the pad-free area of a given evaporative cooling pad when compared to prior art devices.

Other embodiments of the invention may be derived by those skilled in the art, which embodiments will not depart from the spirit and scope of the invention sought to be protected by the claims appended hereto.

Having described the invention in the foregoing specification and the accompanying drawings with such clarity of detail that those skilled in the art may readily and simple practice the teachings herein, that which we claim is:

1. A cabinet for an evaporative cooler comprising:
    a base having four corners;
    a top having four corners; and
    ventilator panels adapted to have a cooling pad mounted on each panel, each ventilator panel having four corners;
    said base, top, and panels each being precision molded of a plastic material, said base and top having self-locating and self-jigging mounting means formed in each corner, and each of said panels having mounted means formed at each corner for cooperating with the mounting means of the base and top to removably secure the base and top together to form said cabinet and to provide means for removably securing the ventilator panels to the cabinet.

2. A ventilator panel for an evaporative cooler comprising:
    a frame;
    means for removably mounting a cooler pad on the frame;
    a water trough;
    means forming openings through the trough to permit water in the trough to flow out of the trough; and
    a downwardly sloping substantially planar distribution lip formed on the trough and extending continuously and longitudinally therealong, said lip being positioned so that water flowing out of the trough flows on the lip for distribution along the length of said lip and flowing onto said cooler pad.

3. The ventilator panel of claim 2 in which the distribution lip is provided with a substantially sharp linear edge.

4. The ventilator panel of claim 3 in which the edge of distribution lip contacts the top surface of a cooling pad mounted on the panel substantially in the middle thereof.

5. A non-louvered ventilator panel for an evaporative cooler comprising:
    a frame having two substantially parallel vertical sides;
    means for removably mounting a cooler pad having a surface on the panel; and
    a plurality of stand-off means positioned between the vertical sides of the panel and a surface of a pad mounted thereon, said stand-off means adapted to contact the surface of a pad substantially horizontally from one side of the panel to the other for positioning a pad for maximum air flow therethrough and for directing water flowing down the surface of a cooler pad into the pad.

* * * * *